United States Patent
Waltermann et al.

(10) Patent No.: US 7,600,127 B2
(45) Date of Patent: Oct. 6, 2009

(54) SYSTEM AND METHOD FOR ISO IMAGE UPDATE AND ISO IMAGE DECONSTRUCTION INTO MODULAR COMPONENTS

(75) Inventors: Rod David Waltermann, Rougemont, NC (US); Mark Charles Davis, Durham, NC (US); Seiichi Kawano, Kanagawa (JP)

(73) Assignee: Lenovo Singapore Pte. Ltd, Singapore (SG)

( * ) Notice: Subject to any disclaimer, the term of this patent is extended or adjusted under 35 U.S.C. 154(b) by 826 days.

(21) Appl. No.: 11/181,581

(22) Filed: Jul. 13, 2005

(65) Prior Publication Data

US 2007/0016786 A1 Jan. 18, 2007

(51) Int. Cl.
*H04L 9/32* (2006.01)
(52) U.S. Cl. ...................................... 713/181
(58) Field of Classification Search .................. 713/181
See application file for complete search history.

(56) References Cited

U.S. PATENT DOCUMENTS

| | | | | |
|---|---|---|---|---|
| 4,991,146 | A * | 2/1991 | Ransdell et al. | 367/98 |
| 6,009,176 | A * | 12/1999 | Gennaro et al. | 713/170 |
| 6,311,271 | B1 * | 10/2001 | Gennaro et al. | 713/170 |
| 6,728,711 | B2 * | 4/2004 | Richard | 707/9 |
| 6,895,507 | B1 * | 5/2005 | Teppler | 726/19 |
| 6,898,709 | B1 * | 5/2005 | Teppler | 713/178 |
| 6,928,444 | B2 * | 8/2005 | Richard | 707/10 |
| 6,981,092 | B2 * | 12/2005 | Piepho | 711/111 |
| 7,178,068 | B2 * | 2/2007 | Maison et al. | 714/45 |
| 7,210,037 | B2 * | 4/2007 | Samar | 713/176 |
| 7,260,584 | B2 * | 8/2007 | Hailey et al. | 707/102 |
| 7,464,403 | B2 * | 12/2008 | Hardman, Jr. | 726/14 |
| 2001/0056425 | A1 * | 12/2001 | Richard | 707/10 |
| 2002/0078355 | A1 * | 6/2002 | Samar | 713/176 |
| 2003/0188227 | A1 * | 10/2003 | Maison et al. | 714/42 |
| 2004/0044707 | A1 * | 3/2004 | Richard | 707/204 |
| 2004/0088500 | A1 * | 5/2004 | Piepho | 711/154 |
| 2004/0246902 | A1 * | 12/2004 | Weinstein et al. | 370/238 |
| 2005/0080808 | A1 * | 4/2005 | Hailey et al. | 707/102 |
| 2005/0080814 | A1 * | 4/2005 | Hailey et al. | 707/103 R |
| 2005/0081144 | A1 * | 4/2005 | Hailey et al. | 715/513 |
| 2005/0102669 | A1 * | 5/2005 | Marney et al. | 717/174 |
| 2005/0154983 | A1 * | 7/2005 | Hailey et al. | 715/530 |

(Continued)

OTHER PUBLICATIONS

Brett Schwarz, Hacking Red Hat kickstart, Apr. 2003, Linux Journal, vol. 2003 Issue 108.*

(Continued)

*Primary Examiner*—David García Cervetti
(74) *Attorney, Agent, or Firm*—Rogitz & Associates

(57) ABSTRACT

A method for updating an ISO file, e.g., to add a digital signature to the ISO file, includes adding a supplemental file composed of, e.g., all zeroes to the ISO file before recording, and then recording the ISO file with supplemental file to an optical disk using ISO format. A digital signature is computed after recording. The zeroes in the supplemental file are replaced by the values of the digital signature and the file is re-saved. Also, an ISO file that might have a common part and several unique parts, e.g., for respective languages, is deconstructed such that only a single copy of the common part is recorded to disk, avoiding multiple recordations of the same data.

6 Claims, 3 Drawing Sheets

U.S. PATENT DOCUMENTS

2005/0188207 A1* 8/2005 Fujimoto et al. ............. 713/177
2005/0271206 A1* 12/2005 Kazami ...................... 380/201
2005/0273864 A1* 12/2005 Suzuki et al. ................. 726/27
2007/0283339 A1* 12/2007 Hardman, Jr. ............... 717/168

OTHER PUBLICATIONS

Luigi Bitonti, Burning a RedHat CD HowTo, 2003.*

* cited by examiner

SYSTEM AND METHOD FOR ISO IMAGE UPDATE AND ISO IMAGE DECONSTRUCTION INTO MODULAR COMPONENTS

FIELD OF THE INVENTION

The present invention relates generally to ISO images on optical disks.

BACKGROUND OF THE INVENTION

When a personal computer is turned on, a basic input-output system (BIOS) that is stored in non-volatile solid state memory of the computer is invoked to begin what is known as a "boot" process, in which various initialization chores are undertaken. Among the most important of these chores is the copying of an operating system from disk storage of the computer over into typically a volatile solid state memory of the computer, for execution of the operating system by the processor of the computer when the computer is being used. When the computer is turned off or when it is "re-booted", the operating system is flushed from the memory. By executing the operating system from the relatively fast memory instead of from the disk, computer operations are accelerated.

Among the chores of booting is to prompt the user to enter a password, so that use of the computer is enabled. This password is sometimes referred to as the "power-on password. Without proper password entry, the use of the operating system is denied. Additionally, the hard disk drive (HDD) of the computer may have its own password, so that even when the power-on password is properly entered, access to the HDD is denied unless the HDD password is also input.

Recognizing that users can forget their passwords, a limited operating system, referred to herein as a "secure operating system" (also sometimes referred to in the art as a "service O.S."), may be provided to the user to undertake limited, "safe" tasks. That is, a "secure" operating system is configured to accomplish only predetermined limited tasks, and because of this the secure O.S. cannot feasibly be corrupted or infected with malicious code. Also, this O.S. is not suitable for other "productive" uses of the computer, so the end user cannot accomplish other work using it. One of these limited tasks may be to issue a challenge question to the user, which, if correctly answered, enables the user to reset the power-on password and, hence, to boot the standard O.S. The secure O.S., like the standard O.S., must be booted.

The present invention recognizes that various files, including rescue and recovery files, may be provided on optical disks using International Standards Organization (ISO) format. As understood herein, since optical disks originally were envisioned as being write-once, read-only storages, the ISO file standard did not provide for updating files once imaged onto disk, in contrast to other file systems. Thus, ISO files remain static, and if an ISO file must be updated, the entire file must be regenerated.

The present invention critically recognizes that this is a drawback for a number of reasons. For instance, it complicates placing a digital signature in the file, because owing to the vagaries of optical disk recording and the requirements of ISO, significant data manipulation that cannot be predicted in advance of recording typically occurs when creating the ISO file, and the digital signature depends on the entire file data. Thus, a digital signature cannot be reliably computed before an ISO file is actually laid down, hence, the signature cannot be incorporated into the file without regenerating the entire file.

Additionally, in the case of several files that are essentially the same except for language differences in, e.g., the user interfaces, a unique copy of each language version must be stored on the optical disk, consuming large space. This is because, recall, an ISO file remains static per the conventions of the ISO file system. With these critical observations in mind, the invention herein is provided.

SUMMARY OF THE INVENTION

The present invention provides a means for updating an ISO-formatted file without regenerating the entire file, and in some aspects provides a means for deconstructing ISO files into sub-components to allow for reduced storage space by storing only a single copy of components of a multi-version (e.g., for multiple languages) file that are common across all versions.

In a general sense, a method for updating an ISO file on an optical disk includes adding a supplemental data structure composed of place holder values, such as, e.g., zeroes, to the ISO file before recording the ISO file to an optical disk, and then recording the ISO file with supplemental data structure to, e.g., a hard disk drive using ISO format. Then, the method includes replacing at least some place holder values in the supplemental data structure with values of update data, prior to recording the file to an optical disk.

The above method is useful for, e.g., appending a digital signature to an ISO file for recording onto an optical disk. Accordingly, a method is disclosed for adding a digital signature to an ISO file. The method includes adding a supplemental data structure composed of substantially all place holder values to the ISO file before recording the ISO file to an optical disk. The method contemplates saving the ISO file with supplemental data structure, computing a digital signature for the ISO file with supplemental data structure after saving, and then replacing at least some place holder values in the supplemental data structure with values of the digital signature to render a signed ISO file. Then, the signed ISO file is recorded to the optical disk.

Subsequently, when it is desired to read the ISO file from the disk, the digital signature is read from the disk and stored in computer memory. The ISO file is then read from the disk, and a test signature is computed from the ISO file. The test signature is compared with the digital signature to determine whether the signatures match. To facilitate this, the offset of the supplemental file can be read and stored in memory and the ISO file read up to the offset, at which point the supplemental file in memory can be zeroed out and computation of the test signature completed using the zeroed-out version of the supplemental file, so that the test signature is computed with the same data as was the original digital signature.

An optical disk is also disclosed that has an ISO file and a digital signature appended to the ISO file, with the digital signature representing the ISO file in the exact form the ISO file has after having been recorded to the disk.

Also, a recording computer is disclosed for recording at least one ISO file to an optical disk. The computer includes logic which adds a string of place holder values to the ISO file before recording the ISO file to an optical disk, with the string having a size at least in part based on an anticipated size of a digital signature representing the ISO file. The computer also has logic that computes a digital signature for the ISO file with string, and logic is also provided for replacing at least some place holder values in the string with values of the digital signature. Logic is disclosed recording the ISO file with supplemental data structure having values of update data to the optical disk.

A reading computer is set forth herein for reading an ISO file from an optical disk. The ISO file has a digital signature recorded with it on the disk, and the reading computer includes logic for reading the digital signature from the disk, and logic for maintaining a copy of the digital signature in a memory of the reading computer. Logic is also provided for reading the ISO file from the disk. The reading computer further includes logic that computes a test signature from the ISO file, and logic for comparing the test signature with the digital signature to determine whether the signatures match.

In another aspect, a deconstruction method is disclosed. For N ISO files, with N being an integer greater than one and with each file having a common part that is identical across all N files and a respective unique part, the method contemplates saving only a single version of the common part to optical disk. The method also envisions saving a version of each of the N unique parts to the optical disk. In some implementations, the unique parts can be characterized by representing respective human languages.

In non-limiting embodiments, a table of contents (TOC) is generated that includes entries respectively representing the unique parts and their locations on the disk and the common part and its location on the disk. The parts are ordered to ensure contiguity of relevant parts by logical block address (LBA). A copy of the TOC may be stored with each unique part, and the common part can be stored at the end of the unique parts. An optical disk is also disclosed that has one and only one common part of an ISO file, N unique parts associated with the common part, with each unique part representing a respective human language, and a data structure associating the common part and the unique parts. Each unique part is recorded with a respective copy of the data structure.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
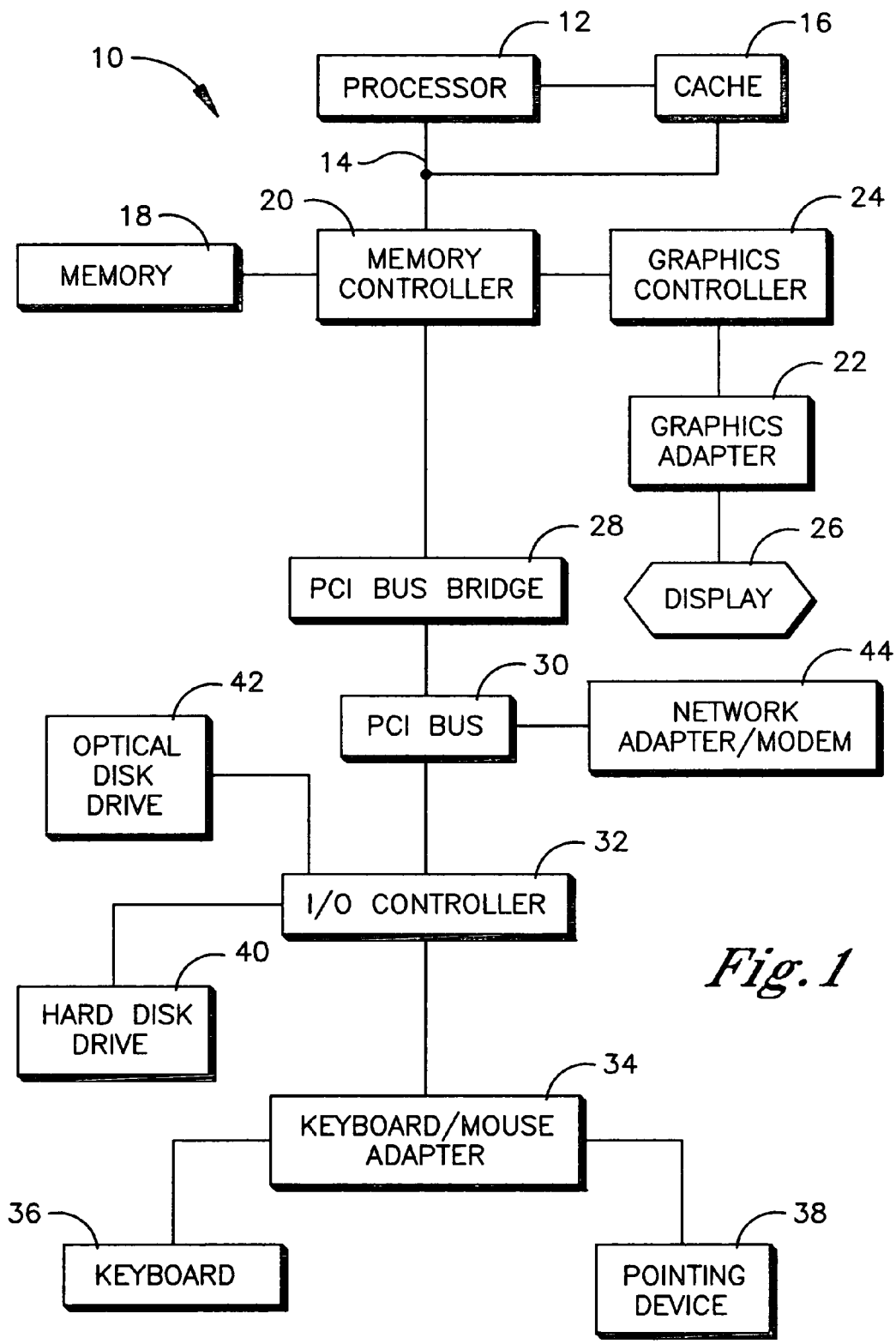
FIG. 1 is a block diagram of a non-limiting computer that can use the present invention.

Referring initially to FIG. 1, a high-level block diagram of a data processing system, generally designated 10, is shown in which the present invention may be implemented. The system 10 in one non-limiting embodiment is a personal computer or laptop computer, and can function as the below-described recording computer and/or reading computer. The system 10 includes a processor 12, which may be, without limitation, a PowerPC processor available from International Business Machines Corporation of Armonk, N.Y. (or other processors made by, e.g., Intel or AMD and common to the industry). The processor 12 is connected to a processor bus 14, and a cache 16, which is used to stage data to and from the processor 12 at reduced access latency, is also connected to the processor bus 14. In non-limiting embodiments the processor 12 can access data from the cache 16 or from a. system solid state memory 18 by way of a memory controller function 20. Also, the memory controller 20 is connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which may be implemented by a mouse, trackball, or the like. Additionally, a hard disk drive 40 is connected to the I/O controller 32. If desired, an optical disk drive 42, such as a DVD or CD drive, can be connected to the I/O controller 32. In some implementations a network adapter 44 can be attached to the PCI bus 30 as shown for connecting the data processing system 10 to a local area network (LAN), the Internet, or both. In any case, in accordance with principles known in the art, during power-on the processor 12 executes a basic input/output system (BIOS) program that may be stored in the memory 18, to load an operating system in the hard disk drive 40 into the memory 18.

Figure 2:
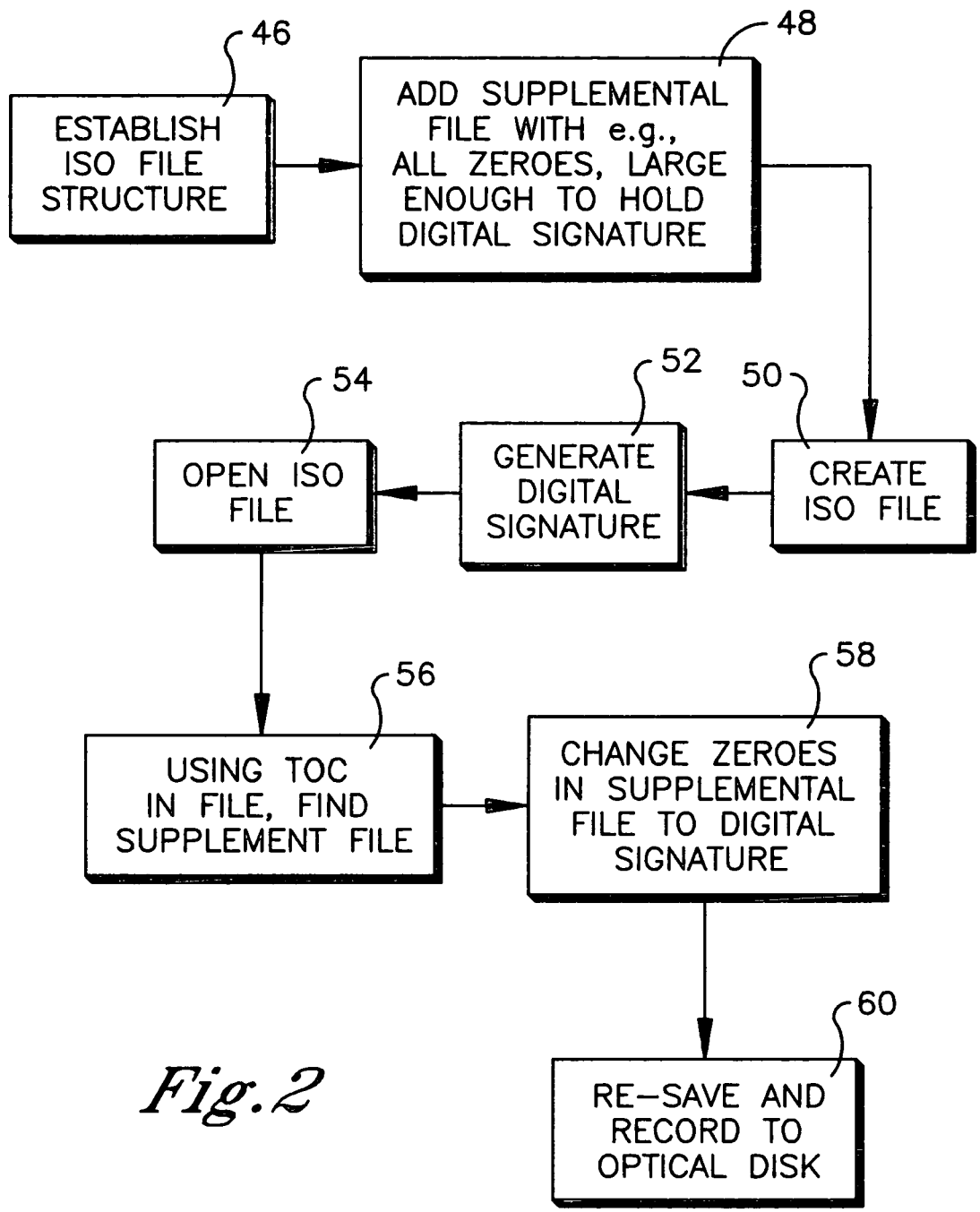
FIG. 2 is flow chart of a non-limiting implementation of the update logic.

Now referring to FIG. 2 for the logic that can be employed by a recording computer, at block 46 an ISO-formatted file (sometimes referred to as an "image") is laid out. The ISO file may include an entire suite of files that may make up an operating system, indeed that can make up more than a single version of the operating system. This version of the file may be stored on, e.g., the HDD 40.

Proceeding to block 48, a supplemental file is added to the ISO file. The supplemental file contains place holder values which, in one non-limiting implementation, may all be zeroes. The supplemental file has a size that is at least equal to the anticipated size of the to-be-computed digital signature of the ISO file. The ISO file includes a table of contents (TOC) listing various parts of the file and their locations, typically in terms of offsets from a reference location. The offset may be, e.g., a logical block address (LBA). An entry is created in the TOC for the supplemental file. Thus, at block 50 the ISO file with supplemental file essentially is in a created state and may be saved to, e.g., the HDD 40.

As intended in the non-limiting aspect shown, the logic next proceeds to block 52 to generate the digital signature of the ISO file. As recognized herein, the digital signature ideally accounts for the ISO file as it will actually be recorded on the optical disk, including, e.g., any ISO-specific file formatting that may be generated. The digital signature is generated in accordance with digital signature principles known in the art. The digital signature with ISO file essentially establishes a digitally signed ISO file.

Moving to block 54, the ISO file is opened after generation of the digital signature, but before recording it to the optical disk, and then at block 56 the TOC is used to locate the supplemental file. At block 58, at least the relevant place holder values in the supplemental file are changed to ones so that the supplemental file now contains the value of the digital signature. The supplemental file is re-saved and then recorded to the optical disk drive 42, without having to re-generate the entire ISO image.

In non-limiting embodiments, while recording the signed ISO file to the optical disk drive 42, the controller can update, with the digital signature, unscrambled frames of the ISO file as the frames are being sent for recording, prior to scrambling the frames in accordance with optical drive scrambling principles known in the art. In other implementations the logic of the optical drive 42 as may be embodied in, e.g., firmware of the drive can insert the digital signature as the optical drive scrambles the frames pursuant to optical drive principles known in the art and then record the scrambled frames to an optical disk such as but not limited to, e.g., a CD-ROM. If desired, the digital signature may be determined concurrently with initial ISO file lay down, e.g., by keeping a running digital signature calculator that processes new portions of the ISO file as they are being laid down.

Figure 3:
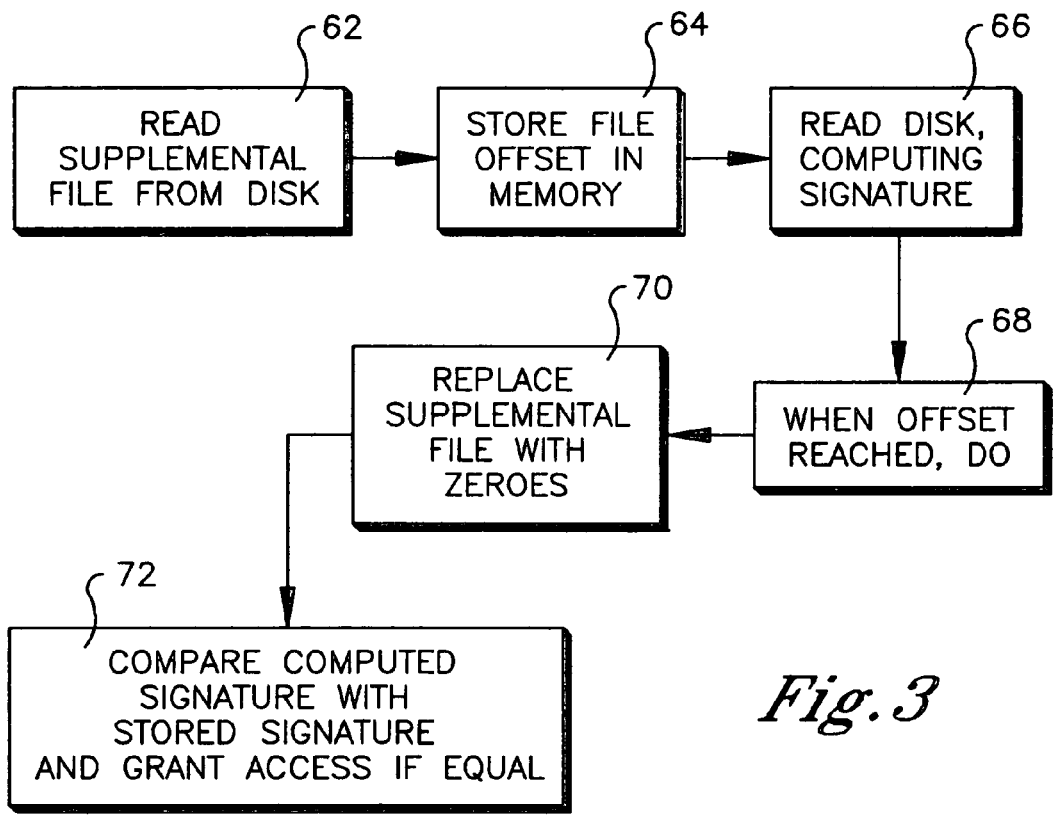
FIG. 3 is flow chart of a non-limiting implementation of recovering the digital signature that was generated using the logic of FIG. 2.

FIG. 3 illustrates the logic that a reading computer may use to read the file that was recorded using the logic of FIG. 2. Commencing at block 62, the supplemental file is read from the disk and stored to local solid state memory at block 64, along with the location (e.g., the offset) of the supplemental file. The TOC on the disk can be used to locate the supplemental file. Moving to block 66, the disk is read up to the offset of the supplemental file and concurrently therewith if desired a test signature is computed. When the offset of the supplemental file is reached, the values of the supplemental file in memory are replaced with the place holder values (e.g., with zeroes) at block 70 and computation of the test signature is completed based thereon, so that the test digital signature is computed using the same information (i.e., with a zeroed-out supplemental file) as was the digital signature that was computed in FIG. 2. At block 72, the test signature is compared with the digital signature as it was recorded to disk in FIG. 2. If a match is found, access to the ISO image may be granted, and otherwise access may be denied and/or an "error" message returned, it being understood that other action may be taken based on the results of the comparison of the test signature and digital signature as might be required for the particular application.

It is to be understood that while the non-limiting example above updates an ISO file with a digital signature, the present invention is not necessarily limited to digital signatures but can apply to other ISO file update operations as well.

Figure 4:
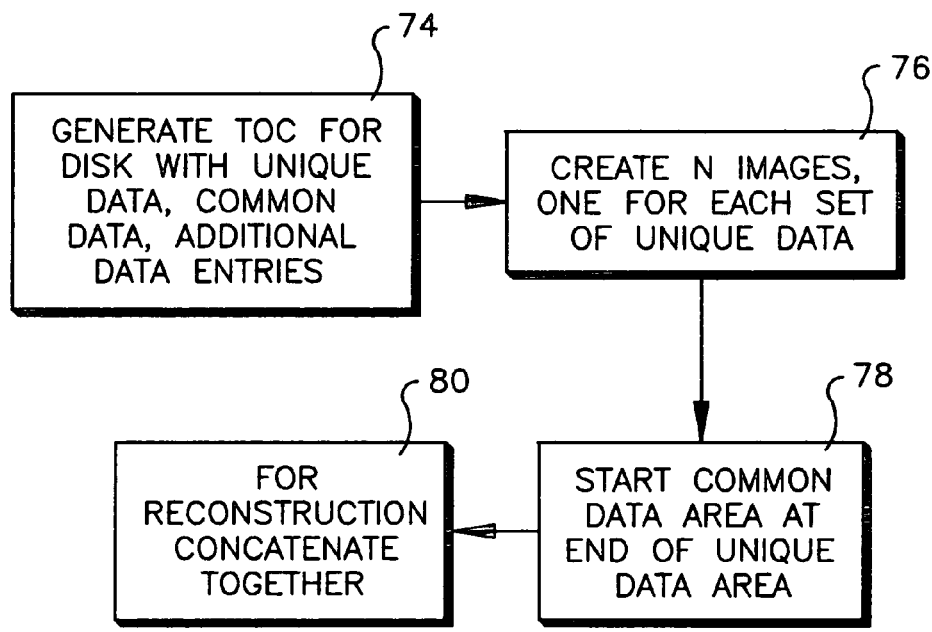
FIG. 4 is a flow chart of the deconstruction logic.

Turning now to FIG. 4, logic is shown for deconstructing an ISO file into sub-components. The present invention recognizes that heretofore, N complete versions of an ISO file, for instance, an operating system, had to be supplied to a buyer, one version per human language that the buyer might possibly wish to use. The present invention also understands that much code in an operating system is common across all languages, i.e., is independent of human language, and that only parts of each version are unique to the particular language of the version. Accordingly, by using the logic of FIG. 4, one and only one copy of the common part is saved to disk, at significant data storage savings. It is to be understood that while the non-limiting example discussed herein postulates unique parts that are unique by virtue of representing respective human languages, present deconstruction principles apply to other ISO images that have a common part and several unique parts, to avoid saving multiple copies of the common part.

As understood herein, every ISO image must have the files it contains in the same order across all versions. Accordingly, a TOC is generated at block 74 that holds the correct ISO image layout, with the contents of the optical disk being ordered to ensure that proper logical block address (LBA) contiguity exists. As one example, the TOC can be constructed to list all unique parts first, along with their offsets, followed by the common part and its offset and, if desired, followed in turn by any additional data that may be stored on the disk.

At block 76, N ISO images are created, one for each unique part. Proceeding to block 78, each image is broken into segments at the offsets in the TOC. A copy of the TOC is included with each unique part, and only a single common part is retained. Note that unique parts do not need to be the same size as each other, because the TOC, which stores the offsets of the various parts, remains with each unique part. The start of the common part is stored on an optical disk at the end of the unique parts (also stored on the disk) at block 78 and the size of the common part remains constant, so that the TOC is always correct. To reconstruct the complete ISO image with common part plus user-desired unique part, at block 80 the user-desired unique part is concatenated onto the common part using the information in the TOC.

While the particular SYSTEM AND METHOD FOR ISO IMAGE UPDATE AND ISO IMAGE DECONSTRUCTION INTO MODULAR COMPONENTS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". For example, instead of a tactilely-manipulated "access" or other button on a keyboard, the present key signal can be generated when a user "manipulates" a voice recognition input device by, e.g., speaking the word "access". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for adding a digital signature to an ISO file, comprising:
    adding a supplemental data structure composed of substantially all place holder values to the ISO file before recording the ISO file to an optical disk;
    saving the ISO file with supplemental data structure, a table of contents (TOC) being associated with the ISO file and including information related to a location of the supplemental data structure;
    computing a digital signature for the ISO file with supplemental data structure after saving;
    using the TOC to locate the supplemental data structure;
    replacing at least some place holder values in the supplemental data structure with values of the digital signature to render a signed ISO file; and
    recording the signed ISO file to the optical disk.

2. The method of claim 1, comprising, after the replacing act, re-saving at least the supplemental data structure.

3. The method of claim 1, comprising:
    reading the digital signature from the optical disk;
    maintaining a copy of the digital signature in a computer memory;
    reading the ISO file from the disk;
    computing a test signature from the ISO file; and
    comparing the test signature with the digital signature to determine whether the signatures match.

4. The method of claim 3, comprising maintaining an offset of the supplemental data structure in memory and reading the ISO file to the offset, at which point the act of computing the test signature is undertaken.

5. The method of claim 3, wherein before the act of computing the test signature, the method includes replacing the values of the digital signature in the supplemental data structure with place holder values.

6. A reading computer for reading at least one ISO file from an optical disk, the ISO file having a digital signature recorded with it on the disk, comprising:

logic reading the digital signature from the disk;

logic maintaining a copy of the digital signature in a memory of the reading computer;

logic reading the ISO file from the disk;

logic computing a test signature from the ISO file;

logic comparing the test signature with the digital signature to determine whether the signatures match;

logic maintaining an offset of the digital signature in memory and logic reading the ISO file to the offset; and logic replacing the values of the digital signature with place holder values and computing the test signature based on the file read to the offset and the digital signature with place holder values.

* * * * *

UNITED STATES PATENT AND TRADEMARK OFFICE
CERTIFICATE OF CORRECTION

PATENT NO. : 7,600,127 B2
APPLICATION NO. : 11/181581
DATED : October 6, 2009
INVENTOR(S) : Waltermann et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Fifth Day of October, 2010

David J. Kappos
*Director of the United States Patent and Trademark Office*